(12) United States Patent
Namboodiri et al.

(10) Patent No.: US 10,154,249 B2
(45) Date of Patent: Dec. 11, 2018

(54) SYSTEM AND METHOD FOR CAPTURING HORIZONTAL DISPARITY STEREO PANORAMA

(71) Applicant: International Institute of Information Technology, Hyderabad, Hyderabad (IN)

(72) Inventors: Anoop M Namboodiri, Kothamangalam (IN); Rajat Aggarwal, Ludhiana (IN); Amrisha Vohra, Sarai Rohilla (IN)

( * ) Notice: Subject to any disclaimer, the term of this patent is extended or adjusted under 35 U.S.C. 154(b) by 22 days.

(21) Appl. No.: 15/627,224

(22) Filed: Jun. 19, 2017

(65) Prior Publication Data
US 2017/0366800 A1 Dec. 21, 2017

(30) Foreign Application Priority Data
Jun. 20, 2016 (IN) .............................. 201641021124

(51) Int. Cl.
| | | |
|---|---|---|
| *H04N 13/02* | (2006.01) | |
| *H04N 5/232* | (2006.01) | |
| *H04N 13/246* | (2018.01) | |
| *H04N 13/218* | (2018.01) | |
| *H04N 13/236* | (2018.01) | |
| *G02B 27/22* | (2018.01) | |
| *G02B 13/06* | (2006.01) | |
| *G02B 5/09* | (2006.01) | |

(52) U.S. Cl.
CPC ............. *H04N 13/246* (2018.05); *G02B 5/09* (2013.01); *G02B 13/06* (2013.01); *G02B 27/2235* (2013.01); *H04N 5/23238* (2013.01); *H04N 13/218* (2018.05); *H04N 13/236* (2018.05)

(58) Field of Classification Search
CPC .. H04N 13/246; H04N 13/236; H04N 13/218; H04N 5/23238; H04N 5/2628; H04N 5/2259; H04N 13/00; H04N 13/02; H04N 7/00; H04N 5/2329; G02B 5/09; G02B 13/06; G02B 27/2235; G03B 35/00; G03B 37/00
USPC ........ 348/36, 37, 42, 46, 47, 49, 50; 352/69, 352/57, 86; 359/725, 462; 396/436, 324
See application file for complete search history.

(56) References Cited

U.S. PATENT DOCUMENTS 7,446,733 B1 * 11/2008 Hirimai .................. G02B 3/005
345/32

* cited by examiner

*Primary Examiner* — Sherrie Hsia
(74) *Attorney, Agent, or Firm* — The Law Office of Austin Bonderer, PC; Austin Bonderer (57) ABSTRACT

A system for capturing horizontal disparity stereo panorama is disclosed. The system includes a multi surface selective light reflector unit, a secondary reflector and a computing unit. The multi surface selective light reflector unit (a) obtains light rays from a 3D scene of outside world that are relevant to create (i) a left eye panorama and (ii) a right eye panorama and (b) reflects the light rays without internal reflections between the light rays. The secondary reflector (a) obtains the reflected light rays from the multi surface selective light reflector unit and (b) reflects the light rays through the viewing aperture. The computing unit captures (i) the reflected light rays from the secondary reflector and (ii) the upper part of the 3D scene from a concave lens as a warped image and processes the warped image to (a) the left eye panorama and (b) the right eye panorama.

20 Claims, 12 Drawing Sheets

SYSTEM AND METHOD FOR CAPTURING HORIZONTAL DISPARITY STEREO PANORAMA

CROSS-REFERENCE TO RELATED APPLICATIONS

This application claims priority to Indian patent application no. 201641021124 filed on Jun. 20, 2016, the complete disclosure of which, in its entirely, is herein incorporated by reference.

BACKGROUND

Technical Field

The embodiments herein generally relate to an optical system and processing method, and more particularly, to capture horizontal disparity stereo panorama including images and videos using a panoramic stereo optical system that works with a single camera or multiple cameras.

Description of the Related Art

Existing approaches for capturing horizontal disparity stereo panorama involve using either a single moving camera or multiple cameras. The single moving camera captures the horizontal disparity stereo panorama in a sequence of images separated in time and further requires pose correction and alignment to stitch the images. Additionally they need to overcome the horizontal disparity to make it suitable for human consumption. The main drawback of using a single moving camera is that it is applicable only to static scenes. Multiple camera solutions for capturing the horizontal disparity stereo panorama typically require a synchronized multi-camera rig, which makes them large and expensive. Additionally they also involve significant computational overheads to overcome the difficulties in both stitching multiple images and horizontal disparity, and to make the images suitable for human consumption.

Accordingly, there remains a need for a compact panoramic stereo optical system and processing method to capture horizontal disparity stereo panorama for both static and dynamic scenes.

SUMMARY

In view of the foregoing, an embodiment herein provides a system for capturing a horizontal disparity stereo panorama. The system includes a multi surface selective light reflector unit, a secondary reflector and a computing unit. The multi surface selective light reflector unit includes (a) a plurality of mirror surfaces and (b) a viewing aperture. The plurality of mirror surfaces are arranged in a cohesive shape adapted to (a) obtain light rays from a three dimensional (3D) scene of outside world that are relevant to create (i) a left eye panorama and (ii) a right eye panorama and (b) reflect the light rays without internal reflections between the light rays. The secondary reflector adapted to attach to the multi surface selective light reflector unit. The secondary reflector (a) obtains the reflected light rays from the multi surface selective light reflector unit and (b) reflects the light rays through the viewing aperture. The secondary reflector includes a concave lens adapted to reflect an upper part of the 3D scene. The computing unit includes a camera that captures (i) the reflected light rays from the secondary reflector and (ii) the upper part of the 3D scene from the concave lens in a form of a warped image through the viewing aperture. The processor processes the warped image to (a) the left eye panorama and (b) the right eye panorama.

In one embodiment, the processor includes a camera orientation module, a warped image obtaining module, a calibrating module, a panorama creating module and a display module. The camera orientation module (a) aligns a viewing axis of the camera with a central axis of the computing unit and (b) projects binary light patterns onto a screen of the 3D scene. The binary light patterns include (i) normal binary sequence patterns and (ii) inverse binary sequence patterns. The normal binary sequence patterns and the inverse binary sequence patterns are adapted to calibrate the warped image. The warped image obtaining module that obtains the warped image from the camera. The calibrating module (a) computes mapping from world co-ordinates to warped image co-ordinates by decoding the binary light patterns from the warped image at each pixel; (b) analyzes defects in (i) the camera and (ii) the multi surface selective light reflector unit; and (c) minimizes the defects analyzed while computing the mapping from the world co-ordinates to the warped image co-ordinates.

The panorama creating module (a) determines exact eye views of the warped image at each pixel, and (b) de-warps the warped image into (i) the left eye panorama and (ii) the right eye panorama. The display module displays (a) the left eye panorama and (b) the right eye panorama on a stereo display unit. The stereo display unit is at least one of (a) a head-mounted display (b) a three dimensional (3D) projector or (C) a three dimensional (3D) display.

In another embodiment, the plurality of mirror surfaces includes consecutive arrangement of (a) a plurality of left mirror faces and (b) a plurality of right mirror faces. The plurality of left mirror faces and the plurality of right mirror faces are adapted to obtain (a) relevant light rays that correspond to the left eye panorama and (b) relevant light rays that correspond to the right eye panorama respectively.

In yet another embodiment, the consecutive arrangement of the plurality of left mirror faces and the plurality of right mirror faces (i) minimizes stitching artifacts of (a) the left eye panorama and (b) the right eye panorama, (ii) minimizes blind spots in the 3D scene, (iii) minimizes view-point disparity between at least one of (a) consecutive left mirror surfaces adapted to create the left eye panorama or (b) consecutive right mirror surfaces adapted to create the right eye panorama and (iv) minimizes non-uniformity of the light rays captured from the 3D scene.

In yet another embodiment, the plurality of mirror surfaces are curve shaped. The curve shaped plurality of mirror surfaces is adapted to increase a field of view of the 3D scene. The field of view includes (a) a horizontal field of view and (b) a vertical field of view. In yet another embodiment, the camera is replaced by a plurality of cameras.

In yet another embodiment, a vertical cross section of (i) an individual left mirror face of the plurality of left mirror faces and (ii) an individual right mirror face of the plurality of right mirror faces is at least one of (a) a linear shape, (b) a parabolic shape, (c) an hyperbolic shape or (d) an elliptical shape. A horizontal cross section of (i) the individual left mirror face of the plurality of left mirror faces and (ii) the individual right mirror face of the plurality of right mirror faces is at least one of (a) a circular shape or (b) a linear shape.

In yet another embodiment, the camera is at least one of (i) a digital camera sensor, (ii) a hyper spectral imaging sensor, (iii) an infrared image sensor or (iv) a night vision sensor.

In yet another embodiment, the camera is replaced by a projector that projects the light rays from the multi-surface selective light reflector unit corresponding to a left eye view and a right eye view on the screen that acts as a panoramic stereo display.

In one aspect, a system for capturing a horizontal disparity stereo panorama includes a multi surface selective light reflector unit and a computing unit. The multi surface selective light reflector unit includes (a) a plurality of mirror surfaces, (b) a viewing aperture and (c) a concave lens. The plurality of mirror surfaces are arranged in a cohesive shape adapted to (a) obtain light rays from a three dimensional (3D) scene of outside world that are relevant to create (i) a left eye panorama and (ii) a right eye panorama and (b) reflect the light rays without internal reflections between the light rays. The concave lens reflects an upper part of the 3D scene. The computing unit includes a camera and a processor. The camera (i) captures the reflected light rays from the multi surface selective light reflector unit and (ii) the upper part of the 3D scene from the concave lens in a form of a warped image through the viewing aperture. The processor processes the warped image to (a) the left eye panorama and (b) the right eye panorama.

In one embodiment, the processor includes a camera orientation module, a warped image obtaining module, a calibrating module, a panorama creating module and a display module. The camera orientation module (a) aligns a viewing axis of the camera with a central axis of the computing unit and (b) projects binary light patterns onto a screen of the 3D scene. The binary light patterns include (i) normal binary sequence patterns and (ii) inverse binary sequence patterns. The normal binary sequence patterns and the inverse binary sequence patterns are adapted to calibrate the warped image. The warped image obtaining module that obtains the warped image from the camera. The calibrating module (a) computes mapping from world co-ordinates to warped image co-ordinates by decoding the binary light patterns from the warped image at each pixel; (b) analyzes defects in (i) the camera and (ii) the multi surface selective light reflector unit; and (c) minimizes the defects analyzed while computing the mapping from the world co-ordinates to the warped image co-ordinates. The panorama creating module (a) determines exact eye views of the warped image at each pixel, and (b) de-warps the warped image into (i) the left eye panorama and (ii) the right eye panorama. The display module displays (a) the left eye panorama and (b) the right eye panorama on a stereo display unit. The stereo display unit is at least one of (a) a head-mounted display (b) a three dimensional (3D) projector or (C) a three dimensional (3D) display.

In another embodiment, the plurality of mirror surfaces includes consecutive arrangement of (a) a plurality of left mirror faces and (b) a plurality of right mirror faces. The plurality of left mirror faces and the plurality of right mirror faces are adapted to obtain (a) relevant light rays that correspond to the left eye panorama and (b) relevant light rays that correspond to the right eye panorama respectively.

In yet another embodiment, the consecutive arrangement of the plurality of left mirror faces and the plurality of right mirror faces (i) minimizes stitching artifacts of (a) the left eye panorama and (b) the right eye panorama, (ii) minimizes blind spots in the 3D scene, (iii) minimizes view-point disparity between at least one of (a) consecutive left mirror surfaces adapted to create the left eye panorama or (b) consecutive right mirror surfaces adapted to create the right eye panorama and (iv) minimizes non-uniformity of the light rays captured from the 3D scene.

In yet another embodiment, the plurality of mirror surfaces are curve shaped. The curve shaped plurality of mirror surfaces is adapted to increase a field of view of the 3D scene. The field of view includes (a) a horizontal field of view and (b) a vertical field of view. In yet another embodiment, the camera is replaced by a plurality of cameras.

In yet another embodiment, a vertical cross section of (i) an individual left mirror face of the plurality of left mirror faces and (ii) an individual right mirror face of the plurality of right mirror faces is at least one of (a) a linear shape, (b) a parabolic shape, (c) an hyperbolic shape or (d) an elliptical shape. A horizontal cross section of (i) the individual left mirror face of the plurality of left mirror faces and (ii) the individual right mirror face of the plurality of right mirror faces is at least one of (a) a circular shape or (b) a linear shape.

In yet another embodiment, the camera is at least one of (i) a digital camera sensor, (ii) a hyper spectral imaging sensor, (iii) an infrared image sensor or (iv) a night vision sensor.

In yet another embodiment, the camera is replaced by a projector that projects the light rays from the multi-surface selective light reflector unit corresponding to a left eye view and a right eye view on the screen that acts as a panoramic stereo display.

In another aspect, a method for capturing a horizontal disparity stereo panorama is disclosed. The method includes steps of: (a) obtaining, using a multi surface selective light reflector unit, light rays from a three dimensional (3D) scene of outside world that are relevant to create (i) a left eye panorama and (ii) a right eye panorama; (b) reflecting, using the multi surface selective light reflector unit, the light rays to at least one of (i) a secondary reflector or (ii) a camera; (c) capturing, using the camera, the reflected light rays in a form of a warped image from at least one of (i) the secondary reflector or (ii) the multi surface selective light reflector unit and an upper part of the 3D scene from a concave lens; and (d) processing, using a computing unit, the warped image to (a) the left eye panorama and (b) the right eye panorama.

In one embodiment, the processing includes steps of: (a) aligning, using a camera orientation module, a viewing axis of the camera with a central axis of the computing unit; (b) projecting, using the camera orientation module, binary light patterns on a screen of the 3D scene; (c) obtaining, using a warped image obtaining module, the warped image from the camera; (d) computing, using a calibrating module, mapping from world co-ordinates to warped image co-ordinates; (e) analyzing, using the calibrating module, defects in (i) the camera and (ii) the multi surface selective light reflector unit; (f) minimizing, using the calibrating module, the defects analyzed while computing the mapping from the world co-ordinates to the warped image co-ordinates; (g) determining, using a panorama creating module, exact eye views of the warped image at each pixel; (h) de-warping, using the panorama creating module, the warped image into the left eye panorama and the right eye panorama; and (i) displaying, using a display module, (a) the left eye panorama and (b) the right eye panorama on a stereo display unit.

The panoramic stereo optical system captures the horizontal disparity stereo panorama with uniform resolution. The panoramic stereo optical system quickly processes the warped image to horizontal disparity stereo panorama in real time. The panoramic stereo optical system is used to capture the warped image and further allows for post processing on the computing device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to capture a horizontal disparity stereo panorama (e.g., including images and videos) for both static and dynamic scenes. The embodiments herein achieve this by providing a panoramic stereo optical system that includes a multi surface selective light reflector unit, a computing unit and a camera to capture the horizontal disparity stereo panorama. Referring now to the drawings, and more particularly to FIGS. 1A through 11, where similar reference characters denote corresponding features consistently throughout the figures, preferred embodiments are shown.

Figure 1A:
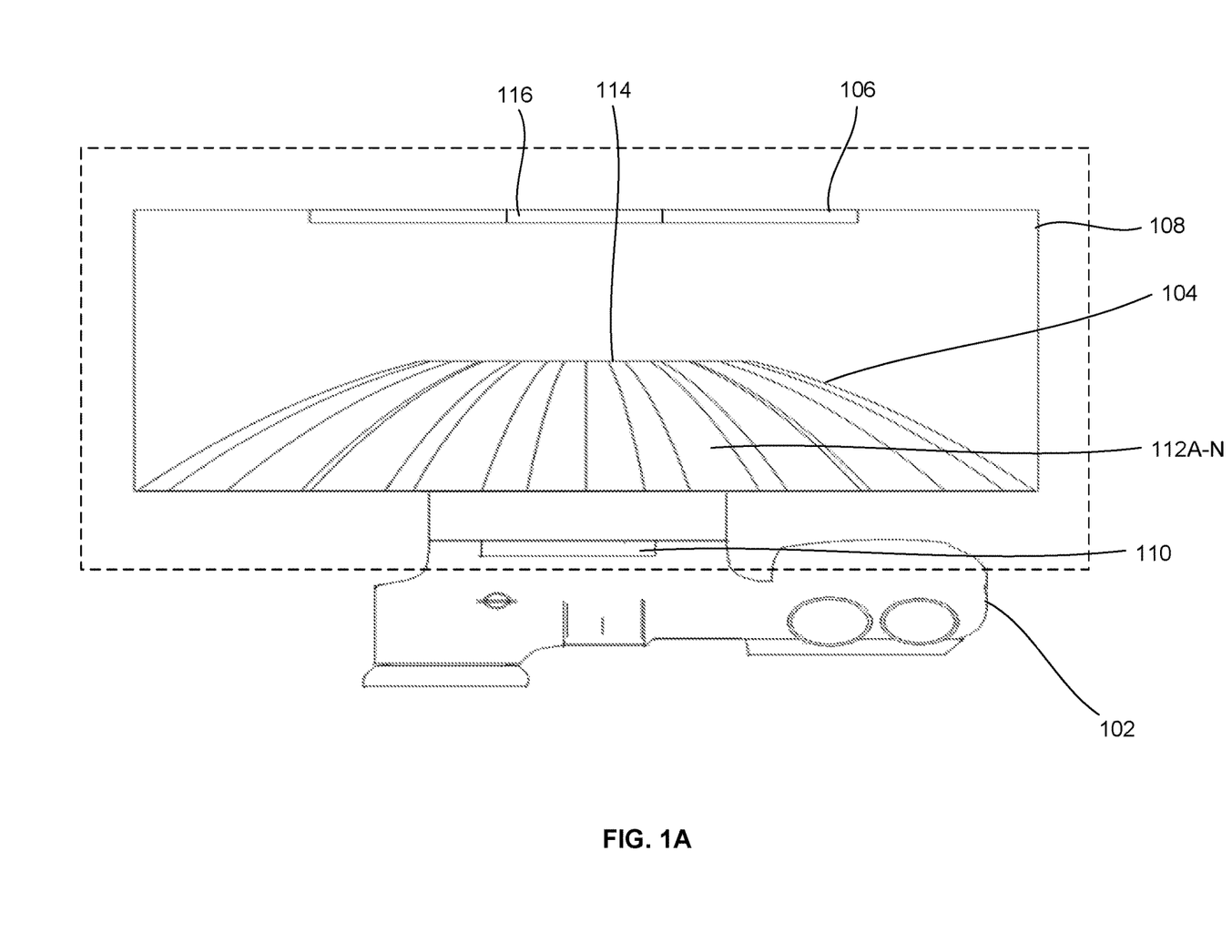
FIG. 1A illustrates a side view of a panoramic stereo optical system that includes a secondary reflector to capture a horizontal disparity stereo panorama according to a first embodiment herein.

FIG. 1A illustrates a side view of a panoramic stereo optical system that includes a secondary reflector 106 to capture a horizontal disparity stereo panorama according to a first embodiment herein. The panoramic stereo optical system includes a computing unit 102, a multi surface selective light reflector unit 104 and the secondary reflector 106. The multi surface selective light reflector unit 104 includes a plurality of mirror surfaces 112A-N and a viewing aperture 114. The plurality of mirror surfaces 112A-N are arranged in a cohesive shape adapted to (a) obtain light rays from a three dimensional (3D) scene of outside world that are relevant to create (i) a left eye panorama and (ii) a right eye panorama and (b) reflect the light rays without internal reflections between the light rays. The secondary reflector 106 is adapted to attach to the top of the multi surface selective light reflector unit 104. The secondary reflector 106 is adapted to (a) obtain the reflected light rays from the multi surface selective light reflector unit 104 and (b) reflect the light rays through the viewing aperture 114. The secondary reflector 106 includes a concave lens 116 in the centre adapted to reflect an upper part of the 3D scene. The computing unit 102 includes a camera 110 and a processor. In an embodiment, the computing unit 102 is a smart phone, a personal digital assistance, a tab, an electronic notebook etc. The camera 110 captures (i) the reflected light rays from the secondary reflector 106 and (ii) the upper part of the 3D scene from the concave lens 116 in a form of a warped image through the viewing aperture 114. The warped image is not human-viewable. The processor processes the warped image to (a) the left eye panorama and (b) the right eye panorama. In one embodiment, the processor processes the warped image at a remote unit during post processing.

The secondary reflector 106 is at least one of (i) a parabolic reflector or (ii) a flat reflector. The parabolic reflector is adapted to reflect the light rays to the camera 110 with better resolution in a lower part of the 3D scene than in the upper part of the 3D scene. The panoramic stereo optical system further includes a connector 108 adapted to connect the multi surface selective reflector unit 104 and the secondary reflector 106. The connector 108 is transparent to avoid obstacles in capturing the light rays from the 3D scene of the outside world. In one embodiment, the panoramic stereo optical system includes one or more microphones that are adapted to capture audio along with the horizontal disparity stereo panorama.

Figure 1B:
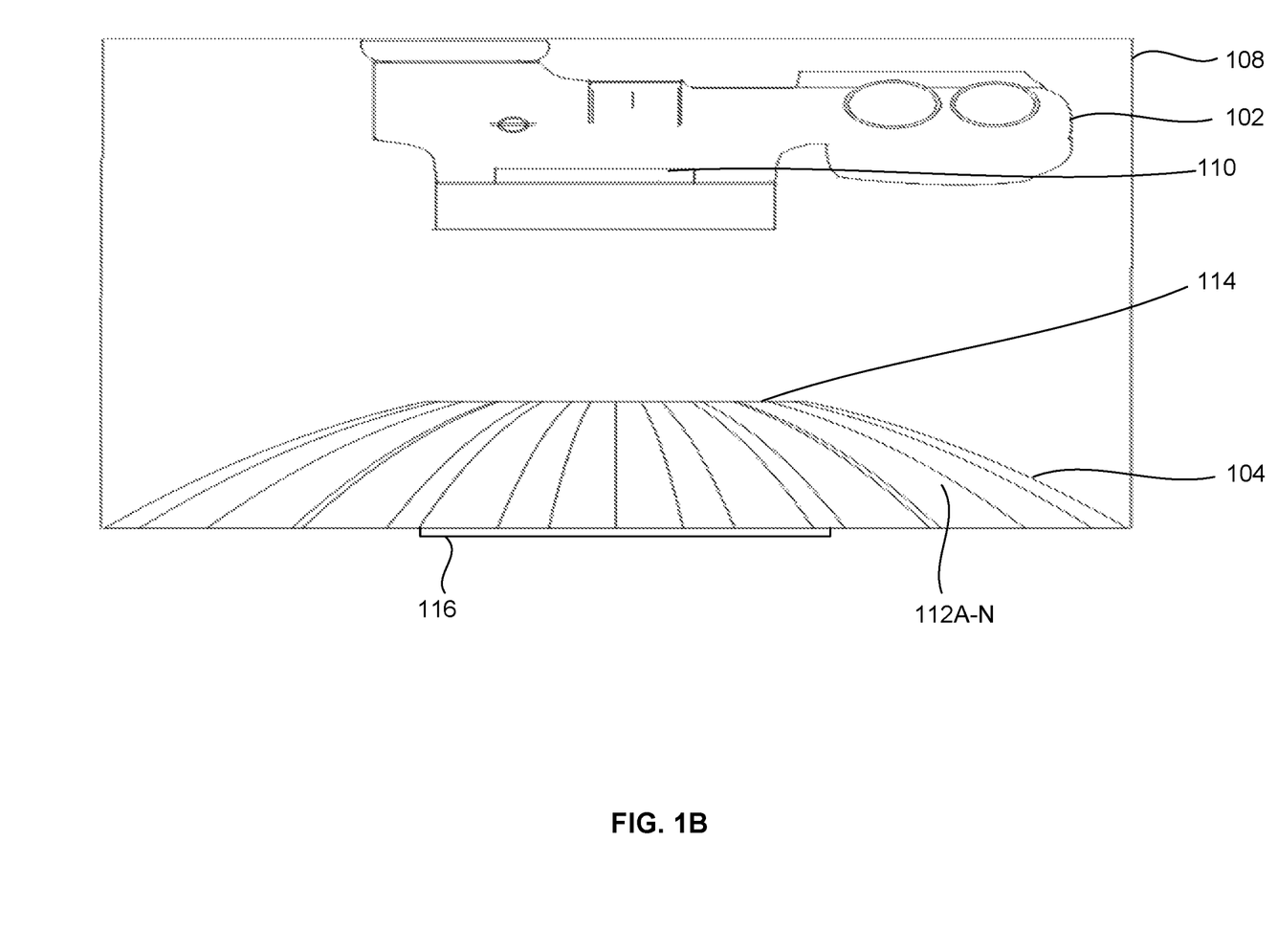
FIG. 1B illustrates the panoramic stereo optical system that captures the horizontal disparity stereo panorama without the secondary reflector according to a second embodiment herein.

FIG. 1B illustrates a panoramic stereo optical system that captures the horizontal disparity stereo panorama without the secondary reflector 106 of FIG. 1A, according to a second embodiment herein. The panoramic stereo optical system includes the computing unit 102 and the multi surface selective light reflector unit 104. The multi surface selective light reflector unit 104 is adapted to attach to the computing unit 102 without the secondary reflector 106 to provide a compact set up. The multi surface selective light reflector unit 104 includes (a) a plurality of mirror surfaces 112A-N, (b) a viewing aperture 114 and (c) a concave lens 116. The multi surface selective light reflector unit 104 obtains the light rays from the 3D scene and directly reflects the light rays to the camera 110 without the secondary reflector 106. The concave lens 116 reflects the upper part of the 3D scene to the camera 110. The camera 110 obtains the reflected light rays from the multi surface selective light reflector unit 104 and the upper part of the 3D scene from the concave lens 116 in the form of the warped image. The processor processes the warped image to (a) the left eye panorama and (b) the right eye panorama.

Figure 2:
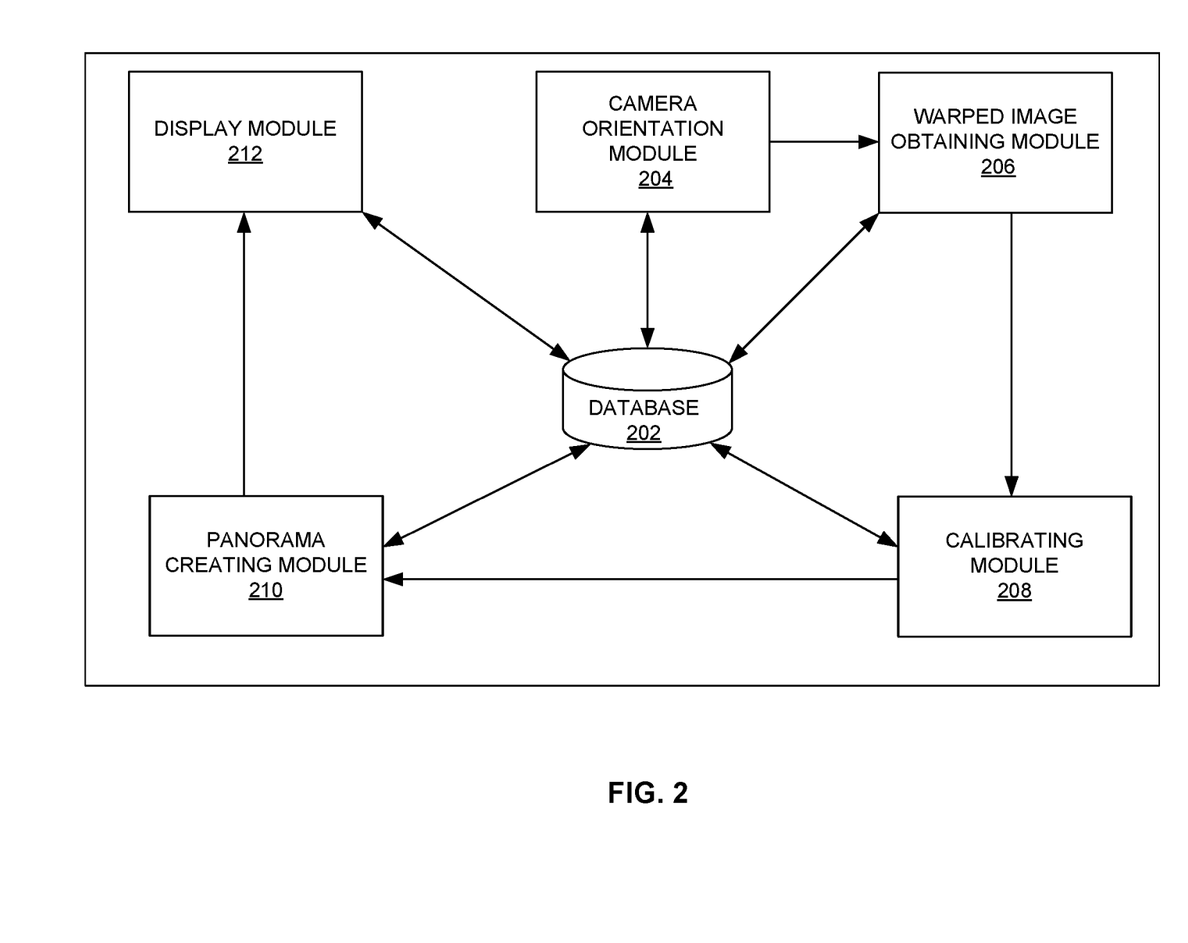
FIG. 2 illustrates an exploded view of a processor of a computing unit of FIG. 1A according to an embodiment herein.

FIG. 2 illustrates an exploded view of the processor of the computing unit 102 of FIG. 1A according to an embodiment herein. The processor includes (a) a database 202, (b) a camera orientation module 204, (c) a warped image obtaining module 206, (d) a calibrating module 208, (d) a panorama creating module 210 and (e) a display module 212. The database 202 stores the warped image and the horizontal disparity stereo panorama for future reference. The camera orientation module 204 (a) aligns a viewing axis of the camera 110 with a central axis of the computing unit 102 and (b) projects binary light patterns onto a screen of the 3D scene. The warped image obtaining module 206 obtains the warped image from the camera 110. The calibrating module 208 (a) computes mapping from world co-ordinates to warped image co-ordinates by decoding the binary light patterns from the warped image at each pixel, (b) analyzes defects in (i) the camera 110 and (ii) the multi surface selective light reflector unit 104 and (c) minimizes the defects analyzed while computing the mapping from the world co-ordinates to the warped image co-ordinates. The binary light patterns include (i) normal binary sequence patterns and (ii) inverse binary sequence patterns. The normal binary sequence patterns and the inverse binary sequence patterns are adapted to calibrate and de-warp the warped image. The panorama creating module 210 (a) determines exact eye views of the warped image at each pixel, and (b) de-warps the warped image into (i) the left eye panorama and (ii) the right eye panorama. The display module 212 displays (a) the left eye panorama and (b) the right eye panorama on a stereo display unit. The stereo display unit is at least one of (a) a head-mounted display (b) a three dimensional (3D) projector or (C) a three dimensional (3D) display.

Figure 3:
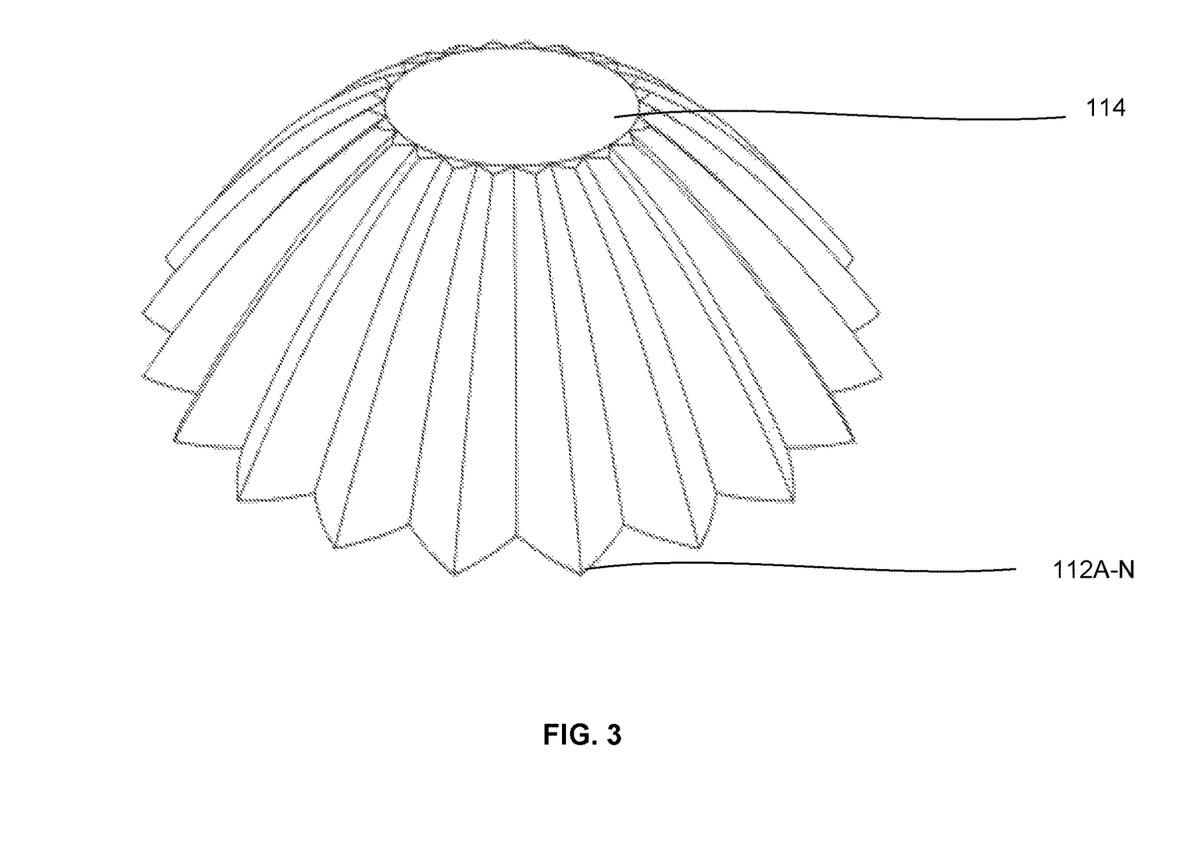
FIG. 3 illustrates a perspective view of a multi surface selective light reflector unit according to an embodiment herein.

FIG. 3 illustrates a perspective view of the multi surface selective light reflector unit 104 according to an embodiment herein. The multi surface selective light reflector unit 104 is a cohesive shaped rigid mirror that includes the plurality of mirror surfaces 112A-N and the viewing aperture 114. The number of mirror surfaces in the plurality of mirror surfaces 112A-N may vary based on the application. The plurality of mirror surfaces 112A-N includes a consecutive arrangement of (a) a plurality of left mirror faces and (b) a plurality of right mirror faces. The plurality of left mirror faces is adapted to obtain relevant light rays that correspond to the left eye panorama. The plurality of right mirror faces is adapted to obtain relevant light rays that correspond to the right eye panorama. In one embodiment, the plurality of left mirror faces and the plurality of right mirror faces are in curved shape adapted to increase a field of view. The field of view includes (a) a horizontal field of view, and (b) a vertical field of view.

Figure 4:
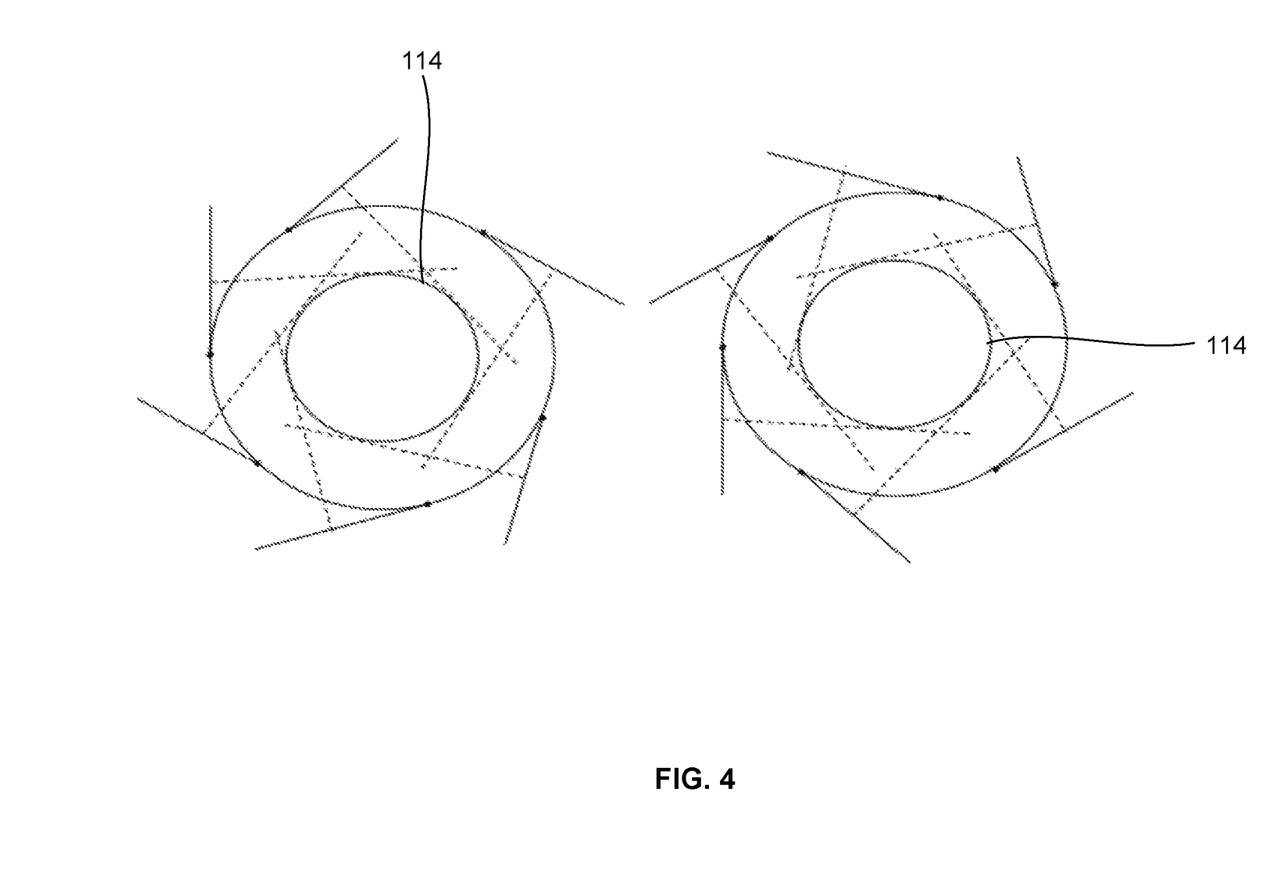
FIG. 4 illustrates a top view of a plurality of mirror surfaces in the multi-surface selective light reflector unit according to an embodiment herein.

FIG. 4 illustrates a top view of the plurality of mirror surfaces 112A-N in the multi-surface selective light reflector unit 104 according to an embodiment herein. The relevant light rays obtained from the plurality of left mirror faces of the plurality of mirror surfaces 112A-N are in an anti-clockwise direction when the plurality of mirror surfaces 112A-N is viewed from above. Similarly, the relevant light rays obtained from the plurality of right mirror faces of the plurality of mirror surfaces 112A-N are in a clockwise direction when the plurality of mirror surfaces 112A-N is viewed from above. In an embodiment, the center of each left mirror face and each right mirror face of the plurality of the left mirror faces and the plurality of the right mirror faces respectively lies on a tangent to the viewing aperture 114. In an embodiment, the plurality of mirror surfaces 112A-N is positioned normal to the viewing aperture 114 to capture tangential rays. The tangential rays are adapted to construct the left eye panorama and the right eye panorama.

Figure 5:
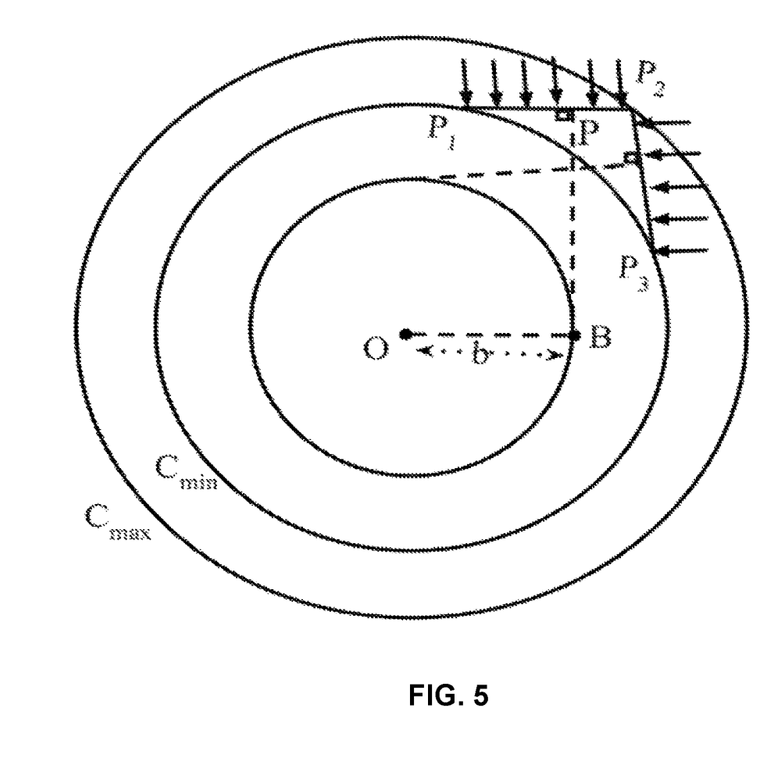
FIG. 5 illustrates an exemplary embodiment of a horizontal cross section of a mirror surface in the multi surface selective light reflector unit according to an embodiment herein.

FIG. 5 illustrates an exemplary embodiment of a horizontal cross section of a mirror surface 112A in the multi surface selective light reflector unit 104 according to an embodiment herein. The horizontal cross section illustrates an arrangement of a left mirror face and a right mirror face on the mirror surface 112A to capture the left side panorama and the right side panorama respectively in a single design according to an embodiment herein. The mirror surface 112A includes (a) the right mirror face $P_1P_2$ adapted to obtain the relevant light rays of the right eye panorama and (b) the left mirror face $P_2P_3$ adapted to obtain the relevant light rays of the left eye panorama. In one embodiment, the right mirror face $P_1P_2$ and the left mirror face $P_2P_3$ are arranged at an equal angular separation, such that $P_1$ lies on circle $C_{min}$, and $P_2$ lies on $C_{max}$, adapted to capture all the tangential rays required for constructing the right eye panorama and the left eye panorama respectively. Similarly, the consecutive right mirror faces and the left mirror faces of the plurality of mirror surfaces 112A-N are arranged at equal angular separation such that Pi (i=even) lies on a circle $C_{max}$, and Pj (j=odd) lies on the circle $C_{min}$, adapted to capture all the tangential rays required for constructing left eye panorama and right eye panorama respectively.

Figure 6:
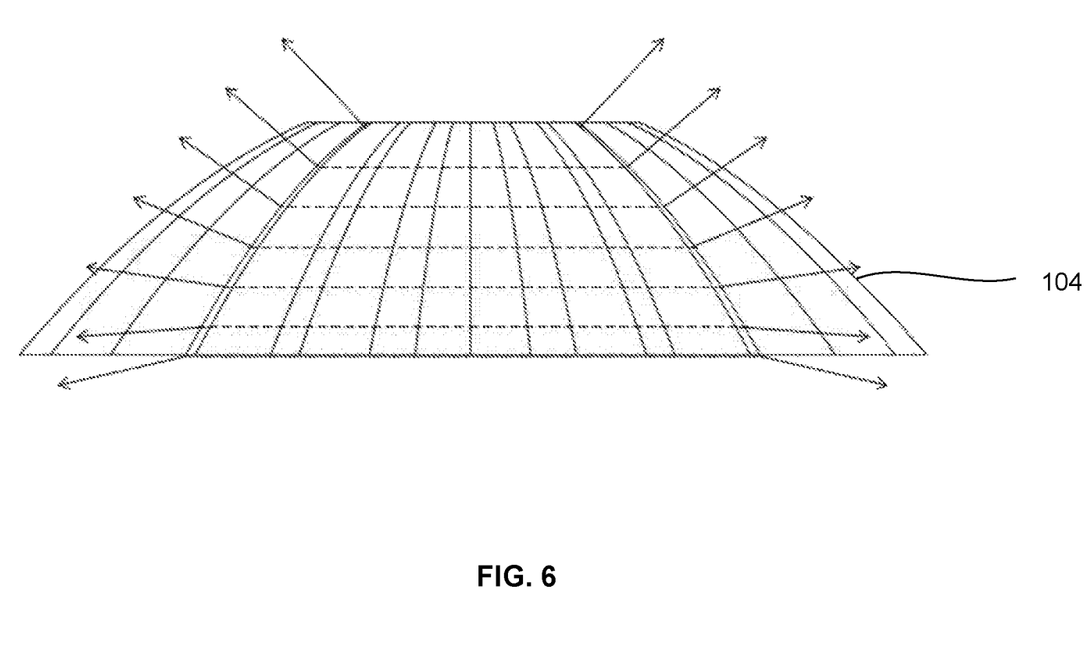
FIG. 6 illustrates a field of view captured by the plurality of mirror surfaces in the multi surface selective light reflector unit according to an embodiment herein.

FIG. 6 illustrates the field of view captured by the plurality of mirror surfaces 112A-N in the multi surface selective light reflector unit 104 according to an embodiment herein. In an embodiment, the plurality of the mirror surfaces 112A-N is curved shape. The curved shape of the plurality of the mirror surfaces 112A-N increases the field of view. The field of view includes (a) the horizontal field of view, and (b) the vertical field of view. The horizontal field of view is an amount of the 3D scene captured by the plurality of the mirror surfaces 112A-N in the horizontal direction. The vertical field of view is the amount of the 3D scene captured by the plurality of the mirror surfaces 112A-N in the vertical direction. In one embodiment, the horizontal field of view varies depending on the number of mirror surfaces 112A-N in the multi surface selective light reflector unit 104. The consecutive arrangement of the plurality of left mirror faces and the plurality of right mirror faces in the curved shape increases overlap between the field of view of the plurality of left mirror faces and the plurality of right mirror faces. The overlap between the field of view is increased to minimize the stitching artifacts and to capture the missing regions of the 3D scene. In one embodiment, the curved shape of the plurality of mirror surfaces 112A-N is limited enough to provide an optimal amount of overlap to overcome stitching artifacts and to avoid the inter-reflections between the neighboring faces of the plurality of the mirror surfaces 112A-N. A vertical cross section of at least one of (i) an individual left mirror face of the plurality of left mirror faces or (ii) an individual right mirror face of the plurality of right mirror faces is at least one of (a) a linear shape, (b) a parabolic shape, (c) a hyperbolic shape or (d) an elliptical shape. A horizontal cross section of at least one of (i) the individual left mirror face of the plurality of left mirror faces or (ii) the individual right mirror face of the plurality of right mirror faces is at least one of (a) a circular shape or (b) a linear shape. In an embodiment, the circular shape at the horizontal cross section is adapted to increase the horizontal field of view. The parabolic shape at the vertical cross section is adapted to provide a uniform resolution of the 3D scene in the vertical direction and to increase the vertical field of view. The range of the 3D scene captured (i.e., the field of view) is varied by selecting different vertical extents in the parabolic shape of the multi surface selective light reflector unit 104 and scaling it in required size. The field of view of the multi surface selective light reflector unit 104 is tilted towards the base of the parabolic shape when selecting a portion of multi surface selective light reflector unit 104 closer to the base of the parabolic shape. In an embodiment, tilting the field of view is adapted to capture the horizontal disparity stereo panorama from a higher vantage point in various applications (e.g., drone platform, ceiling of a room etc.).

Figure 7:
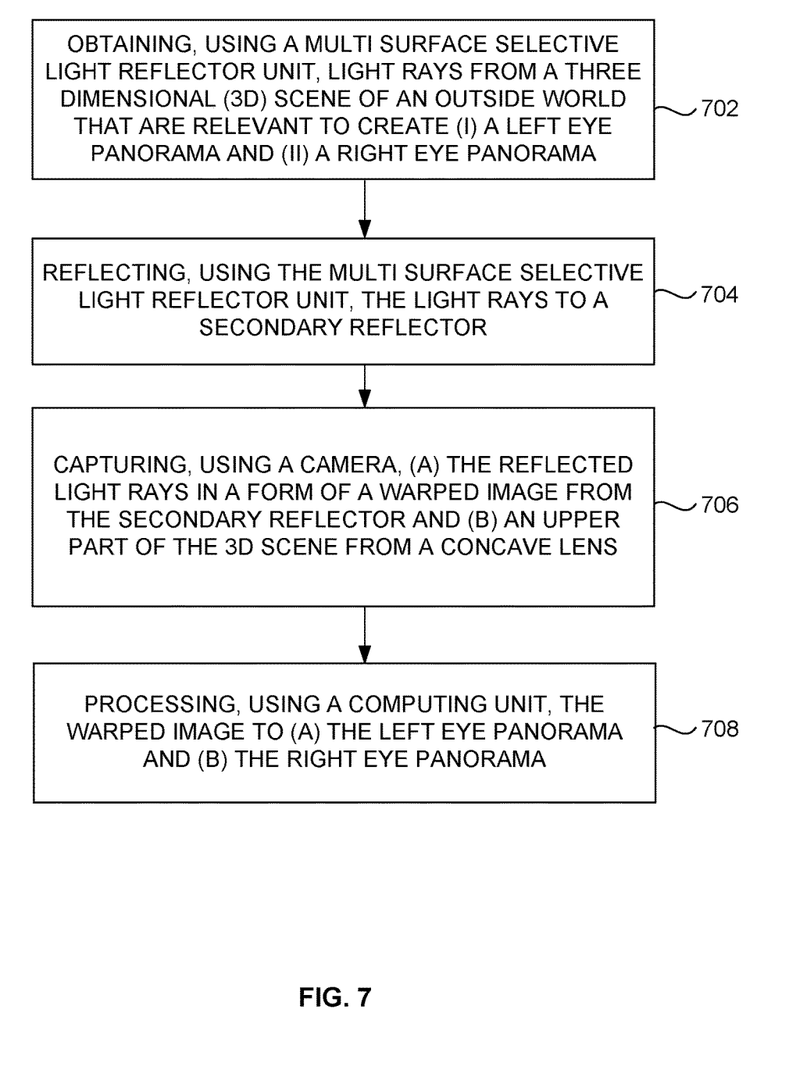
FIG. 7 illustrates a method of capturing a horizontal disparity stereo panorama using the panoramic stereo optical system of FIG. 1A according to an embodiment herein.

FIG. 7 illustrates a method of capturing the horizontal disparity stereo panorama using the panoramic stereo optical system of FIG. 1A according to an embodiment herein. At step 702, the light rays are obtained from the 3D scene of the outside world using the multi surface selective light reflector unit 104. At step 704, the light rays are reflected to the secondary reflector 106 using the multi surface selective light reflector unit 104. At step 706, (a) the reflected light rays from the secondary reflector 106 and (b) the upper part of the 3D scene from the concave lens 116 are captured in the form of the warped image using the camera 110. At step 708, the warped image is processed to (a) the left eye panorama and (b) the right eye panorama using a computing unit 102. The secondary reflector 106 may be either the flat reflector or the parabolic reflector in different embodiments.

Figure 8:
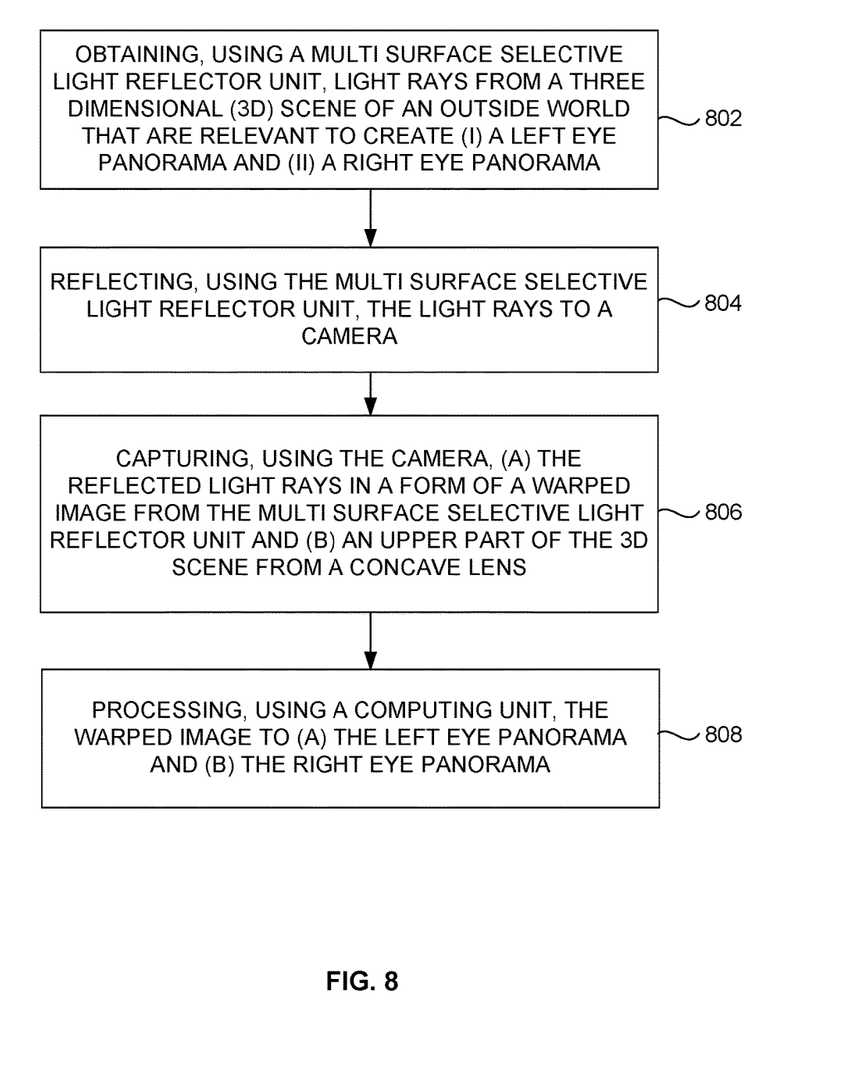
FIG. 8 illustrates a method of capturing the horizontal disparity stereo panorama using the panoramic stereo optical system of FIG. 1B according to an embodiment herein.

FIG. 8 illustrates a method of capturing the horizontal disparity stereo panorama using the panoramic stereo optical system of FIG. 1B according to an embodiment herein. At step 802, the light rays are obtained from the 3D scene of the outside world using the multi surface selective light reflector unit 104. At step 804, the light rays are reflected to the camera 110 using the multi surface selective light reflector unit 104. At step 806, (a) the reflected light rays from the multi surface selective light reflector unit 104 and (b) the upper part of the 3D scene from the concave lens 116 are captured in the form of the warped image using the camera 110. At step 808, the warped image is processed to (a) the left eye panorama and (b) the right eye panorama using a computing unit 102.

Figure 9:
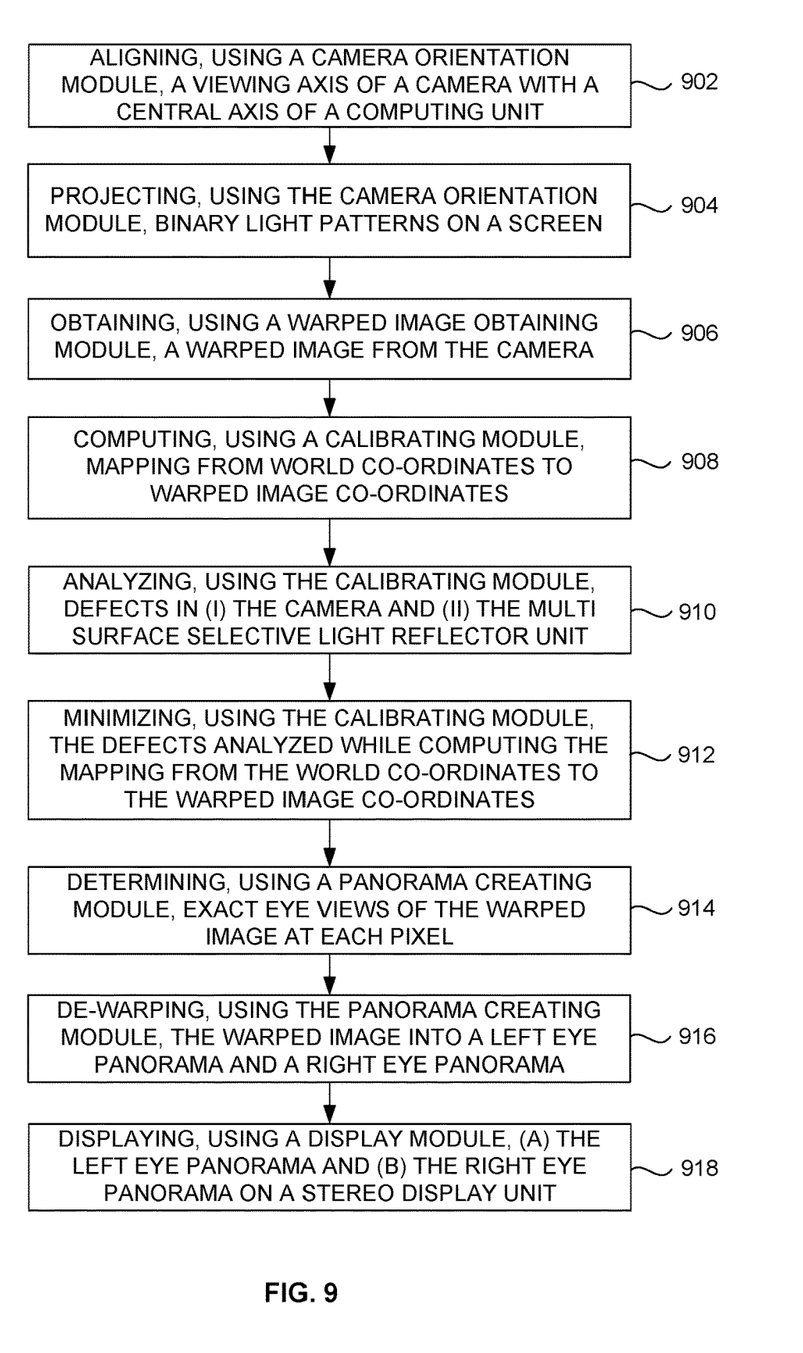
FIG. 9 illustrates a method of processing a warped image to a left eye panorama and a right eye panorama of FIG. 2 according to an embodiment herein.

FIG. 9 illustrates a method of processing the warped image to the left eye panorama and the right eye panorama of FIG. 2 according to an embodiment herein. At step 902, the viewing axis of the camera 110 is aligned with the central axis of the computing unit 102 using the camera orientation module 204. At step 904, the binary light patterns are projected on the screen of the 3D scene using the camera orientation module 204. At step 906, the warped image is obtained from the camera 110 using the warped image obtaining module 206. At step 908, the world co-ordinates to the warped image co-ordinates mapping is computed using the calibrating module 208. At step 910, defects in the camera 110 and the multi surface selective light reflector unit 104 is analyzed using the calibrating module 208. At step 912, the defects analyzed are minimized while the world co-ordinates to the image co-ordinates are mapped using the calibrating module 208. At step 914, exact eye views of the warped image are determined at each pixel using the panorama creating module 210. At step 916, the warped image is de-warped to the left eye panorama and the right eye panorama using the panorama creating module 210. At step 918, the left eye panorama and the right eye panorama are displayed on the stereo display unit using the display module 212. In one embodiment, the stereo display unit is at least one of (a) the head-mounted display (b) the three dimensional (3D) projector or (C) the three dimensional (3D) display.

Figure 10:
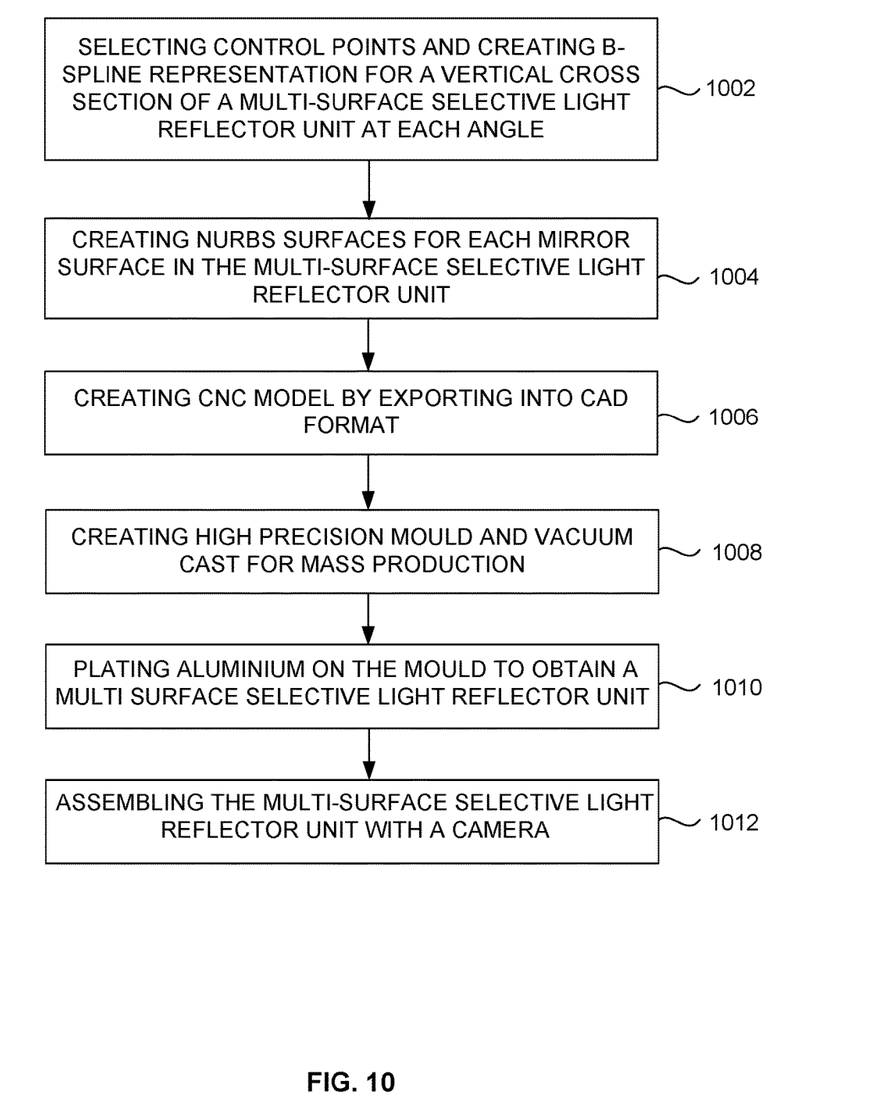
FIG. 10 illustrates a process of manufacturing the multi surface selective reflector unit according to an embodiment herein.

FIG. 10 illustrates a process of manufacturing the multi surface selective reflector unit 104 according to an embodiment herein. At step 1002, control points are selected and a basis spline (B-spline) representation for a vertical cross section of a multi-surface selective reflector unit 104 at each angle is created. At step 1004, Non-uniform rational basis spline (NURBS) surfaces are created for each mirror surface of the plurality of the mirror surfaces 112A-N. At step 1006, a Computer Numeric Control (CNC) model is created by exporting into a Computer Aided Design (CAD) format. At step 1008, a high precision mould is created and a vacuum casting is performed for mass production of a mould. At step 1010, aluminum plating is performed on the mould to obtain the multi surface selective light reflector unit 104. At step 1012, the multi-surface selective reflector unit 104 is assembled with the camera 110 to form the panoramic stereo optical system. In one embodiment, the control points are created with different values depending on the application. In an embodiment, the computer aided design (CAD) format is at least one of (i) an Initial Graphics Exchange Specification or (ii) a STEP used to create the CNC model.

Figure 11:
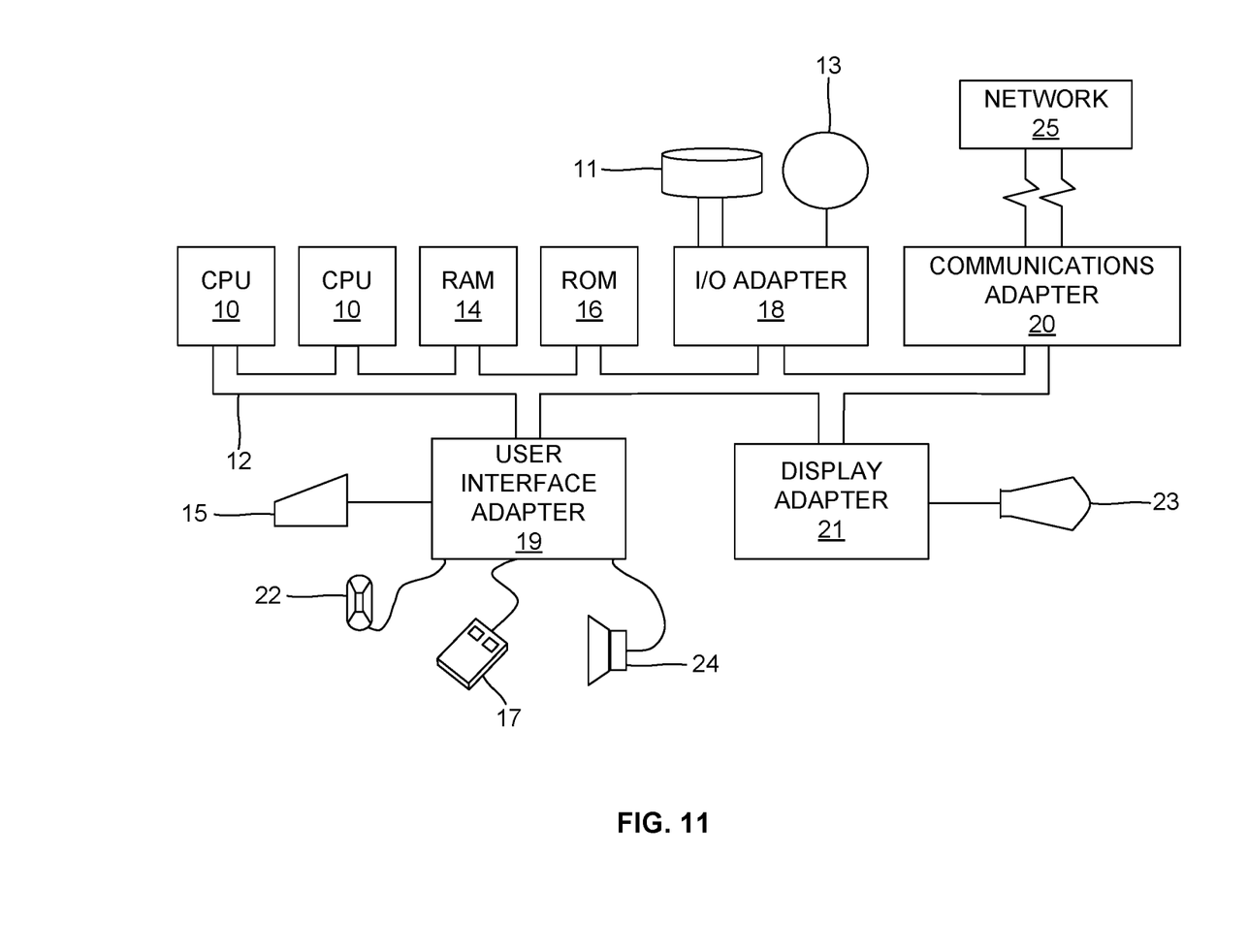
FIG. 11 a schematic diagram of computer architecture used in accordance with the embodiment herein.

A representative hardware environment for practicing the embodiments herein is depicted in FIG. 11. This schematic drawing illustrates a hardware configuration of an information handling/computing unit in accordance with the embodiments herein. The computing unit comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the computing unit. The computing unit can read the inventive instructions on the program storage devices and follow these instructions to execute the methodology of the embodiments herein.

The computing unit further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for capturing a horizontal disparity stereo panorama, comprising:
 a multi surface selective light reflector unit that comprises (a) a plurality of mirror surfaces and (b) a viewing aperture, wherein said plurality of mirror surfaces are arranged in a cohesive shape adapted to (a) obtain light rays from a three dimensional (3D) scene of outside world that are relevant to create (i) a left eye panorama and (ii) a right eye panorama and (b) reflect said light rays without internal reflections between said light rays;
 a secondary reflector adapted to attach to said multi surface selective light reflector unit, wherein said secondary reflector (a) obtains said reflected light rays from said multi surface selective light reflector unit and (b) reflects said light rays through said viewing aperture, wherein said secondary reflector comprises a concave lens adapted to reflect an upper part of said 3D scene; and
 a computing unit that comprises:
  a camera that captures (i) said reflected light rays from said secondary reflector and (ii) said upper part of said 3D scene from said concave lens in a form of a warped image through said viewing aperture; and a processor that processes said warped image to (a) said left eye panorama and (b) said right eye panorama.

2. The system of claim 1, wherein said processor comprises:
 a camera orientation module that
  aligns a viewing axis of said camera with a central axis of said computing unit; and
  projects binary light patterns onto a screen of said 3D scene, wherein said binary light patterns comprise (i) normal binary sequence patterns and (ii) inverse binary sequence patterns, wherein said normal binary sequence patterns and said inverse binary sequence patterns are adapted to calibrate said warped image;
 a warped image obtaining module that obtains said warped image from said camera;
 a calibrating module that
  (a) computes mapping from world co-ordinates to warped image co-ordinates by decoding said binary light patterns from said warped image at each pixel;
  (b) analyzes defects in (i) said camera and (ii) said multi surface selective light reflector unit; and
  (c) minimizes said defects analyzed while computing said mapping from said world co-ordinates to said warped image co-ordinates;
 a panorama creating module that (a) determines exact eye views of said warped image at each pixel, and (b) de-warps said warped image into (i) said left eye panorama and (ii) said right eye panorama; and
 a display module that displays (a) said left eye panorama and (b) said right eye panorama on a stereo display unit, wherein said stereo display unit is at least one of (a) a head-mounted display (b) a three dimensional (3D) projector or (C) a three dimensional (3D) display.

3. The system of claim 1, wherein said plurality of mirror surfaces comprise consecutive arrangement of (a) a plurality of left mirror faces and (b) a plurality of right mirror faces, wherein (i) said plurality of left mirror faces and (ii) said plurality of right mirror faces are adapted to obtain (a) relevant light rays that correspond to said left eye panorama and (b) relevant light rays that correspond to said right eye panorama respectively.

4. The system of claim 3, wherein said consecutive arrangement of said plurality of left mirror faces and said plurality of right mirror faces (i) minimizes stitching artifacts of (a) said left eye panorama and (b) said right eye panorama, (ii) minimizes blind spots in said 3D scene, (iii) minimizes view-point disparity between at least one of (a) consecutive left mirror surfaces adapted to create said left eye panorama or (b) consecutive right mirror surfaces adapted to create said right eye panorama and (iv) minimizes non-uniformity of said light rays captured from said 3D scene.

5. The system of claim 3, wherein a vertical cross section of (i) an individual left mirror face of said plurality of left mirror faces and (ii) an individual right mirror face of said plurality of right mirror faces is at least one of (a) a linear shape, (b) a parabolic shape, (c) an hyperbolic shape or (d) an elliptical shape, wherein a horizontal cross section of (i) said individual left mirror face of said plurality of left mirror faces and (ii) said individual right mirror face of said plurality of right mirror faces is at least one of (a) a circular shape or (b) a linear shape.

6. The system of claim 1, wherein said plurality of mirror surfaces are curve shaped, wherein said curve shaped plurality of mirror surfaces is adapted to increase a field of view of said 3D scene, wherein said field of view comprises (a) a horizontal field of view and (b) a vertical field of view.

7. The system of claim 1, wherein said camera is replaced by a plurality of cameras.

8. The system of claim 1, wherein said camera is at least one of (i) a digital camera sensor, (ii) a hyper spectral imaging sensor, (iii) an infrared image sensor or (iv) a night vision sensor.

9. The system of claim 1, wherein said camera is replaced by a projector that projects said light rays from said multi-surface selective light reflector unit corresponding to a left eye view and a right eye view on said screen that acts as a panoramic stereo display.

10. A system for capturing a horizontal disparity stereo panorama, comprising:
 a multi surface selective light reflector unit, wherein said multi surface selective light reflector unit comprises (a) a plurality of mirror surfaces, (b) a viewing aperture and (c) a concave lens, wherein said plurality of mirror surfaces are arranged in a cohesive shape adapted to (a) obtain light rays from a three dimensional (3D) scene of outside world that are relevant to create (i) a left eye panorama and (ii) a right eye panorama and (b) reflect said light rays without internal reflections between said light rays, wherein said concave lens reflects an upper part of said 3D scene; and
 a computing unit that comprises:
 a camera that (i) captures said reflected light rays from said multi surface selective light reflector unit and (ii) said upper part of said 3D scene from said concave lens in a form of a warped image through said viewing aperture; and
 a processor that processes said warped image to (a) said left eye panorama and (b) said right eye panorama.

11. The system of claim 10, wherein said processor comprises:
 a camera orientation module that aligns a viewing axis of said camera with a central axis of said computing unit; and projects binary light patterns onto a screen of said 3D scene, wherein said binary light patterns comprise (i) normal binary sequence patterns and (ii) inverse binary sequence patterns, wherein said normal binary sequence patterns and said inverse binary sequence patterns are adapted to calibrate said warped image;

a warped image obtaining module that obtains said warped image from said camera;

a calibrating module that
  (a) computes mapping from world co-ordinates to warped image co-ordinates by decoding said binary light patterns from said warped image at each pixel;
  (b) analyzes defects in (i) said camera and (ii) said multi surface selective light reflector unit; and
  (c) minimizes said defects analyzed while computing said mapping from said world co-ordinates to said warped image co-ordinates;

a panorama creating module that (a) finds exact eye views of said warped image at each pixel and (b) de-warps said warped image into (i) said left eye panorama and (ii) said right eye panorama; and a display module that displays (a) said left eye panorama and (b) said right eye panorama on a stereo display unit, wherein said stereo display unit is at least one of (a) a head-mounted display (b) a three dimensional (3D) projector or (C) a three dimensional (3D) display.

12. The system of claim 10, wherein said plurality of mirror surfaces comprise a consecutive arrangement of (a) a plurality of left mirror faces and (b) a plurality of right mirror faces, wherein (i) said plurality of left mirror faces and (ii) said plurality of right mirror faces are adapted to obtain (i) relevant light rays that correspond to said left eye panorama and (ii) relevant light rays that correspond to said right eye panorama respectively.

13. The system of claim 12, wherein said consecutive arrangement of said plurality of left mirror faces and said plurality of right mirror faces (i) minimizes stitching artifacts of (a) said left eye panorama and (b) said right eye panorama, (ii) minimizes blind spots in said 3D scene, and (iii) minimizes view-point disparity between at least one of (a) consecutive left mirror faces adapted to create said left-eye panorama or (b) consecutive right mirror faces adapted to create said right-eye panorama and (iv) minimizes non-uniformity of said light rays captured from said 3D scene.

14. The system of claim 10, wherein said plurality of mirror surfaces are curve shaped, wherein said curve shaped plurality of mirror surfaces is adapted to increase a field of view of said 3D scene, wherein said field of view comprises (a) a horizontal field of view and (b) a vertical field of view.

15. The system of claim 10, wherein said camera is replaced by a plurality of cameras.

16. The system of claim 10, wherein a vertical cross section of at least one of (i) an individual left mirror face of said plurality of left mirror faces or (ii) an individual right mirror face of said plurality of right mirror faces is at least one of (a) a linear shape, (b) a parabolic shape, (c) a hyperbolic shape or (d) an elliptical shape, wherein a horizontal cross section of at least one of (i) said individual left mirror face of said plurality of left mirror faces or (ii) said individual right mirror face of said plurality of right mirror faces is at least one of (a) a circular shape or (b) a linear shape.

17. The system of claim 10, wherein said camera is at least one of (i) a digital camera sensor, (ii) a hyper spectral imaging sensor, (iii) an infrared image sensor or (iv) a night vision sensor.

18. The system of claim 10, wherein said camera is replaced by a projector that projects said light rays from said multi-surface selective light reflector unit corresponding to a left eye view and a right eye view on said screen that acts as a panoramic stereo display.

19. A method for capturing a horizontal disparity stereo panorama, comprising steps of:
  obtaining, using a multi surface selective light reflector unit, light rays from a three dimensional (3D) scene of outside world that are relevant to create (i) a left eye panorama and (ii) a right eye panorama;
  reflecting, using said multi surface selective light reflector unit, said light rays to at least one of (i) a secondary reflector or (ii) a camera;
  capturing, using said camera, said reflected light rays in a form of a warped image from at least one of (i) said secondary reflector or (ii) said multi surface selective light reflector unit and an upper part of said 3D scene from a concave lens; and
  processing, using a computing unit, said warped image to (a) said left eye panorama and (b) said right eye panorama.

20. The method of claim 19, wherein said processing comprising steps of:
  aligning, using a camera orientation module, a viewing axis of said camera with a central axis of said computing unit;
  projecting, using said camera orientation module, binary light patterns on a screen of said 3D scene;
  obtaining, using a warped image obtaining module, said warped image from said camera;
  computing, using a calibrating module, mapping from world co-ordinates to warped image co-ordinates;
  analyzing, using said calibrating module, defects in (i) said camera and (ii) said multi surface selective light reflector unit;
  minimizing, using said calibrating module, said defects analyzed while computing said mapping from said world co-ordinates to said warped image co-ordinates;
  determining, using a panorama creating module, exact eye views of said warped image at each pixel;
  de-warping, using said panorama creating module, said warped image into said left eye panorama and said right eye panorama; and
  displaying, using a display module, (a) said left eye panorama and (b) said right eye panorama on a stereo display unit.

* * * * *